United States Patent
Shimada

(10) Patent No.: US 9,813,596 B2
(45) Date of Patent: Nov. 7, 2017

(54) VIBRATION-TYPE ACTUATOR, INTERCHANGEABLE LENS, IMAGE PICKUP APPARATUS, AND AUTOMATIC STAGE

(71) Applicant: CANON KABUSHIKI KAISHA, Tokyo (JP)

(72) Inventor: Akira Shimada, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/896,999

(22) PCT Filed: Jun. 18, 2014

(86) PCT No.: PCT/JP2014/003268
§ 371 (c)(1),
(2) Date: Dec. 9, 2015

(87) PCT Pub. No.: WO2014/203529
PCT Pub. Date: Dec. 24, 2014

(65) Prior Publication Data
US 2016/0127623 A1    May 5, 2016

(30) Foreign Application Priority Data
Jun. 20, 2013    (JP) ................. 2013-129223

(51) Int. Cl.
*H04N 5/225* (2006.01)
*G02B 7/10* (2006.01)
(Continued)

(52) U.S. Cl.
CPC ............. *H04N 5/2254* (2013.01); *G02B 7/08* (2013.01); *G02B 7/10* (2013.01); *G02B 21/26* (2013.01);
(Continued)

(58) Field of Classification Search
CPC .................................................. H04N 5/2254
See application file for complete search history.

(56) References Cited

U.S. PATENT DOCUMENTS 5,307,170 A * 4/1994 Itsumi ................. H04N 3/1587
348/219.1
5,503,010 A * 4/1996 Yamanaka ............. B82Y 35/00
73/105

(Continued)

FOREIGN PATENT DOCUMENTS

JP    2004304887 A  * 10/2004
JP    2007-185049 A    7/2007
(Continued)

*Primary Examiner* — Gary C Vieaux
(74) *Attorney, Agent, or Firm* — Canon USA, Inc. I.P. Division

(57) ABSTRACT

The present invention provides a vibration-type actuator that makes it possible to improve and stabilize yields.

A vibration-type actuator includes a vibrator including an elastic body with a protrusion having a contact portion, and an electromechanical transducer attached to a surface of the elastic body; and a flexible printed circuit board having an electrode portion and attached to the electromechanical transducer. There is a space between the contact portion and the electromechanical transducer. No end portion of the electrode portion of the flexible printed circuit board is overlapped with the space in a direction perpendicular to the surface of the elastic body.

15 Claims, 9 Drawing Sheets

(51) Int. Cl.
   *H02N 2/00* (2006.01)
   *H02N 2/02* (2006.01)
   *G02B 7/08* (2006.01)
   *G02B 21/26* (2006.01)
   *H04N 5/232* (2006.01)

(52) U.S. Cl.
   CPC .......... *H02N 2/001* (2013.01); *H02N 2/0015* (2013.01); *H02N 2/0085* (2013.01); *H02N 2/026* (2013.01); *H04N 5/23209* (2013.01)

(56) References Cited

U.S. PATENT DOCUMENTS

| | | | | |
|---|---|---|---|---|
| 2005/0242686 | A1* | 11/2005 | Yamamoto | H02N 2/0015 310/323.02 |
| 2006/0220496 | A1* | 10/2006 | Fujimoto | H02N 2/163 310/323.13 |
| 2009/0167111 | A1* | 7/2009 | Mori | H02N 2/0015 310/323.16 |
| 2009/0251026 | A1 | 10/2009 | Kang | |
| 2015/0326147 | A1* | 11/2015 | Shimizu | H02N 2/123 310/323.15 |

FOREIGN PATENT DOCUMENTS

| | | | |
|---|---|---|---|
| JP | 2009-124791 A | | 6/2009 |
| JP | 2011-200051 A | | 10/2011 |
| JP | 2011200051 A | * | 10/2011 |
| JP | 2011234608 A | * | 11/2011 |

* cited by examiner

VIBRATION-TYPE ACTUATOR, INTERCHANGEABLE LENS, IMAGE PICKUP APPARATUS, AND AUTOMATIC STAGE

TECHNICAL FIELD

An aspect of the present invention relates to a vibration-type actuator, and specifically relates to the vibration-type actuator that includes, for example, a plate-like vibrator having a protrusion serving as a frictional member on one surface thereof. Another aspect of the present invention relates to an interchangeable lens including the vibration-type actuator, an image pickup apparatus including the vibration-type actuator, or an automatic stage including the vibration-type actuator.

BACKGROUND ART

As examples of the vibration-type actuator described above, various vibration-type actuators that linearly drive a driven member have been proposed. For example, PTL 1 proposes a vibration-type actuator, whose driving principle will be described with reference to FIG. 5 and FIGS. 6A and 6B. As illustrated in FIG. 5, a vibrator includes a rectangular elastic body 106 (vibrator in PTL 1) and an electromechanical transducer 107 bonded thereto.

FIGS. 6A and 6B illustrate two bending vibration modes of the vibrator. The vibration mode illustrated in FIG. 6A is one of the two bending vibration modes (hereinafter referred to as mode A). Mode A provides a second-order bending vibration in a long-side direction of the rectangular elastic body 106 (indicated by arrow X). The vibration in mode A has three nodes parallel to a short-side direction of the elastic body 106 (indicated by arrow Y). Protrusions 108 are disposed near the nodes of vibration in mode A. The protrusions 108 reciprocate in the direction of arrow X in response to vibration in mode A.

The vibration mode illustrated in FIG. 6B is the other of the two bending vibration modes (hereinafter referred to as mode B). Mode B provides a first-order bending vibration in the short-side direction of the rectangular elastic body 106 (indicated by arrow Y). The vibration in Mode B has two nodes parallel to the long-side direction of the elastic body 106 (indicated by arrow X). The nodes in mode A and the nodes in mode B are substantially orthogonal to each other in the XY plane. The protrusions 108 are disposed near antinodes of vibration in mode B. The protrusions 108 reciprocate in the direction of arrow Z in response to vibration in mode B.

When the vibrations in modes A and B are generated with a predetermined phase difference, an elliptical motion takes place at end portions of the protrusions 108. A slider 116 serving as a driven member is configured to be brought into pressure contact with the end portions of the protrusions 108. The slider 116 can be moved relative to the elastic body 106 in the direction of arrow L by the elliptical motion of the prorusions 108.

In this vibration-type actuator, the driven member is brought into pressure contact with the vibrator that vibrates, so that the driven member performs relative motion in response to the vibration. As a result, it is possible that abnormal noise will occur when the driven member bounces as the vibrator vibrates. It is also possible that relative movement of the driven member will become unstable.

A configuration that addresses these problems will be described with reference to FIGS. 7A and 7B. As illustrated, the elastic body 106 has protrusions 108 and an attached portion to which the electromechanical transducer 107 is attached. The protrusions 108 each have a contact portion to be in contact with a driven member, and a spring portion between the contact portion and the attached portion. The spring portion is provided to give elasticity to the protrusion 108 when the contact portion is pressed by contact with the driven member. A space is created between the contact portion of each protrusion 108 and the electromechanical transducer 107 joined to the protrusions 108. The protrusions 108 each have a standing portion that connects the contact portion to the spring portion. As the spring portion, a spring portion is formed to be thinner than the contact portion, the standing portion, and the attached portion. Thus, when the contact portions of the protrusions 108 are pressed by contact with the driven member, the spring portions are elastically deformed, so that the elastic body 106 exhibits elasticity. This improves stability in relative movement of the elastic body 106 and the driven member.

CITATION LIST

Patent Literature

PTL 1: Japanese Patent Laid-Open No. 2011-200051

SUMMARY OF INVENTION

Technical Problem

To feed power to the vibration-type actuator, for example, a flexible printed circuit board 109 needs to be bonded to the electromechanical transducer 107 with an adhesive, an anisotropic conductive film, an anisotropic paste, or the like. In bonding using any of them, a pressure needs to be applied to the flexible printed circuit board 109 and the electromechanical transducer 107 to achieve conduction and a predetermined thickness and strength. However, if there are spaces between the electromechanical transducer 107 and the protrusions 108 as illustrated in FIG. 7B, the stress may be concentrated on parts of the electromechanical transducer 107 facing the spaces and may cause breakage of the electromechanical transducer 107.

Solution to Problem

An aspect of the present invention relates to a vibration-type actuator that includes a vibrator including an elastic body with a protrusion having a contact portion, and an electromechanical transducer attached to a surface of the elastic body; and a flexible printed circuit board having an electrode portion and attached to the electromechanical transducer. There is a space between the contact portion and the electromechanical transducer. No end portion of the electrode portion of the flexible printed circuit board is overlapped with the space in a direction perpendicular to the surface of the elastic body.

Another aspect of the present invention relates to a vibration-type actuator that includes a vibrator including an elastic body with a protrusion having a contact portion, and an electromechanical transducer attached to a surface of the elastic body; and a flexible printed circuit board having a base portion and an electrode portion on the base portion and attached to the electromechanical transducer. There is a space between the contact portion and the electromechanical transducer. No end portion of the base portion of the flexible printed circuit board is overlapped with the space in a direction perpendicular to the surface of the elastic body.

Another aspect of the present invention relates to a vibration-type actuator that includes a vibrator including an elastic body with a protrusion having a contact portion, and an electromechanical transducer attached to a surface of the elastic body and having an electrode layer; and a flexible printed circuit board attached to the electromechanical transducer. There is a space between the contact portion and the electromechanical transducer. No end portion of the electrode layer of the electromechanical transducer is overlapped with the space in a direction perpendicular to the surface of the elastic body.

Another aspect of the present invention relates to an interchangeable lens including the vibration-type actuator, an image pickup apparatus including the vibration-type actuator, or an automatic stage including the vibration-type actuator.

Advantageous Effects of Invention

According to an aspect of the present invention, even when a flexible printed circuit board is attached to a vibrator having a space between an elastic body and an electromechanical transducer, it is possible to reduce concentration of stress on the electromechanical transducer. Reducing the concentration of stress can reduce breakage of the electromechanical transducer and make it possible to stably manufacture a vibration-type actuator.

Further aspects of the present invention will become apparent from the following description of exemplary embodiments with reference to the attached drawings.

DESCRIPTION OF EMBODIMENTS

First Embodiment

Figure 1:
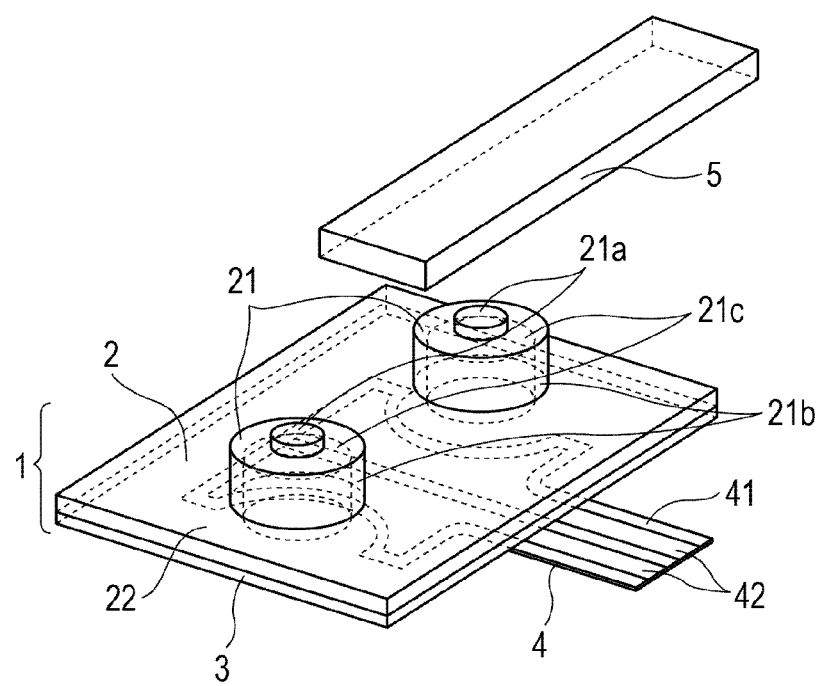
FIG. 1 is a perspective view illustrating a configuration of a vibration-type actuator according to a first embodiment of the present invention.

A first embodiment will be described with reference to FIG. 1. FIG. 1 is a general perspective view of a linear vibration-type actuator. Referring to FIG. 1, the linear vibration-type actuator includes a vibrator 1 and a slider 5 serving as a driven member.

The vibrator 1 includes a piezoelectric element 3 which is a thin plate-like electromechanical transducer, and an elastic body 2 which is attached to one surface of the piezoelectric element 3. The elastic body 2 has an attached portion 22 having a surface to which the piezoelectric element 3 is attached, and protrusions 21. The protrusions 21 each have a contact portion 21a to be in contact with the slider (driven member) 5 when the vibrator 1 is driven, a standing portion 21b between the contact portion 21a and the attached portion 22, and a spring portion 21c between the contact portion 21a and the standing portion 21b. Therefore, the protrusions 21 each have an internal space. In FIG. 1, the standing portion 21b is continuous throughout the periphery of the protrusion 21. Alternatively, for example, the standing portion 21b may have some side faces with a gap, such as an opening, between them. That is, the standing portion 21bmay have a gap around the contact portion 21a. Although the elastic body 2 has two protrusions 21 in this example, the elastic body 2 may have only one protrusion 21 or three or more protrusions 21. For example, the two protrusions 21 are disposed at node portions of vibration in a long-side direction of the vibrator 1 (i.e., in the driving direction of the vibrator 1). The closer the protrusions 21 are to nodes, the larger the amount of driving in the long-side direction. The protrusions 21 may be disposed at antinode portions of vibration in a short-side direction of the vibrator 1 (i.e., in the direction intersecting the driving direction of the vibrator 1). The closer the protrusions 21 are to antinodes, the larger the amount of driving in a thickness direction of the vibrator 1 (i.e., in the thrust direction). Note that a node portion of vibration refers to a location closer to a node than to an antinode of vibration, and an antinode portion of vibration refers to a location closer to an antinode than to a node of vibration.

A flexible printed circuit board 4 for feeding power to the piezoelectric element 3 is attached to a surface of the piezoelectric element 3, the surface being opposite the surface to which the elastic body 2 is attached.

The elastic body 2 may be made of a material having a low vibration damping property, such as metal or ceramic. In manufacture of the elastic body 2, the protrusions 21 may be formed integrally with the elastic body 2 by press molding or cutting, or may be formed separately and attached later on to the elastic body 2 by welding or bonding. There may be a plurality of protrusions 21 as in the present embodiment, or may be only one protrusion 21.

Lead zirconate titanate is used to form the piezoelectric element 3. A lead-free piezoelectric material, such as bismuth sodium titanate, may be used to form the piezoelectric element 3. The piezoelectric element 3 is provided with an electrode pattern made of silver or the like on a surface thereof. The surface provided with the electrode pattern is opposite the surface to which the elastic body 2 is attached. For simplicity, the electrode pattern is not shown in the present embodiment.

Figure 2A:
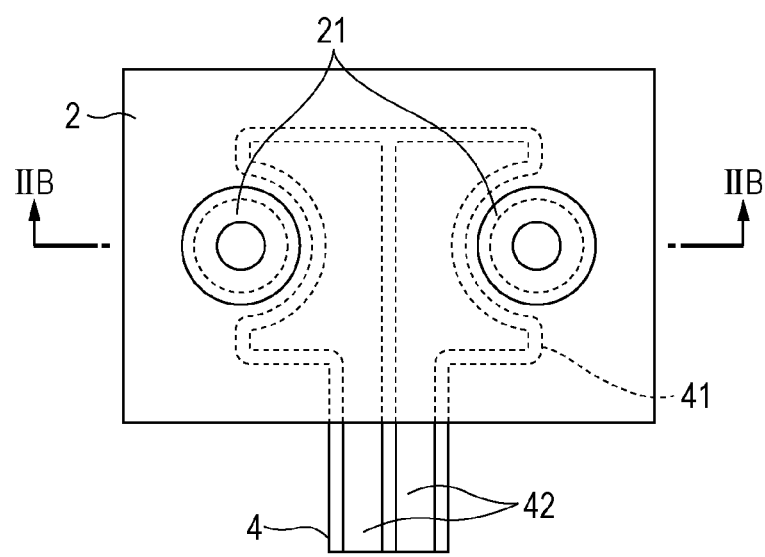
FIG. 2A is a top view illustrating the configuration of the vibration-type actuator according to the first embodiment of the present invention.
Figure 2B:
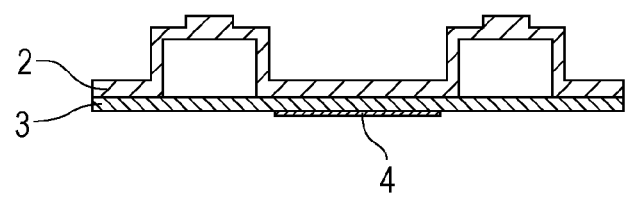
FIG. 2B is a cross-sectional view taken along line IIB-IIB in FIG. 2A.

Polyimide or polyethylene terephthalate may be used to form a base portion 41 of the flexible printed circuit board 4. Copper, silver, or carbon may be used to form the electrode pattern. The base portion 41 is disposed so as not to overlap with the internal spaces of the protrusions 21 in a direction perpendicular to a surface of the elastic body 2, the surface being a surface to which the piezoelectric element 3 is attached (i.e., in the thickness direction of the vibrator 1 or the direction perpendicular to the plane of FIG. 2A). Specifically, the flexible printed circuit board 4 is formed so as not to overlap with the internal spaces of the protrusions 21. The idea that the flexible printed circuit board 4 is not overlapped with the internal spaces of the protrusions 21 in the thickness direction of the vibrator 1 means that the image of the flexible printed circuit board 4 when the vibrator 1 is viewed in the thickness direction of the vibrator 1 does not overlap with the internal spaces of the protrusions 21.

A method for manufacturing the vibration-type actuator will now be described. First, the elastic body 2 and the piezoelectric element 3 are bonded to each other using an adhesive. Next, the piezoelectric element 3 and the flexible printed circuit board 4 are bonded to each other, for example, with an adhesive, an anisotropic conductive film, or an anisotropic paste.

To achieve a desired bonding strength or thickness in bonding, it is necessary to apply a predetermined surface pressure at about room temperature to about 180 degrees (Celsius). In the case of using an anisotropic conductive film or an anisotropic paste, a pressure needs to be applied at 180 degrees (Celsius) to 200 degrees (Celsius) to achieve conduction.

An electrode portion 42 made of a conductive material is formed on the base portion 41. The electrode portion 42 is 17.5 micrometers to 35 micrometers thick, and the base portion 41 is 12.5 micrometers to 25 micrometers thick. When a pressure is applied to the flexible printed circuit board 4 via a component made of a relatively soft material, such as rubber or resin, a stress is produced not only in the electrode portion 42, but also in the entire base portion 41 of the flexible printed circuit board 4.

In the present embodiment, the base portion 41 is disposed so as not to overlap with the internal spaces of the protrusions 21 in the thickness direction of the vibrator 1. Therefore, the vibrator 1 is subjected to pressure in an area not overlapping with the internal spaces of the protrusions 21 of the elastic body 2. If the flexible printed circuit board 4 is disposed over the entire piezoelectric element 3, an excessive stress is concentrated on parts of the piezoelectric element 3 facing the internal spaces of the protrusions 21 due to lack of stiffness.

However, in the present embodiment, the base portion 41 of the flexible printed circuit board 4 is disposed so as to avoid regions overlapping with the internal spaces of the protrusions 21 in the thickness direction of the vibrator 1. Therefore, the concentration of stress on the piezoelectric element 3 can be reduced. It is thus possible to achieve stable manufacture which does not cause breakage of the piezoelectric element 3.

In this example, the base portion 41 of the flexible printed circuit board 4 is disposed so as not to overlap with the internal spaces of the protrusions 21 in the thickness direction of the vibrator 1. However, when the base portion 41 of the flexible printed circuit board 4 is disposed such that at least an end of the base portion 41 is not overlapped with the internal spaces of the protrusions 21 in the thickness direction of the vibrator 1, the concentration of stress on the piezoelectric element 3 can be reduced. By disposing the base portion 41 of the flexible printed circuit board 4 such that no end portion of the base portion 41 is overlapped with the internal spaces of the protrusions 21 in the thickness direction of the vibrator 1, the concentration of stress on the piezoelectric element 3 can be more efficiently reduced.

The driving principle of the vibration-type actuator will not be described here, as it is the same as that in the related art.

Note, however, that the method for producing elliptical motion on a contact surface in the linear vibration-type actuator of the present invention is not limited to that described above. For example, vibrations in bending vibration modes different from those described above may be combined together, or a vibration in a bending vibration mode may be combined with a vibration in a vertical vibration mode where an elastic body expands and contracts in the long-side direction.

Any driving method may be used as long as it is a method that produces elliptical motion on the contact surface by combining a vibration primarily in a vibration mode where the contact surface is displaced in a feed direction and a vibration in a vibration mode where the contact surface is displaced in a thrust direction.

Although the piezoelectric element 3 has a thin rectangular plate-like shape in the present embodiment, the shape of the piezoelectric element 3 is not limited to this. For example, the piezoelectric element 3 may have a rectangular shape with rounded corners. The piezoelectric element 3 may be of any shape, as long as any of the driving methods described above enables relative movement of the vibrator 1 and the slider (driven member) 5.

Second Embodiment

Figure 3:
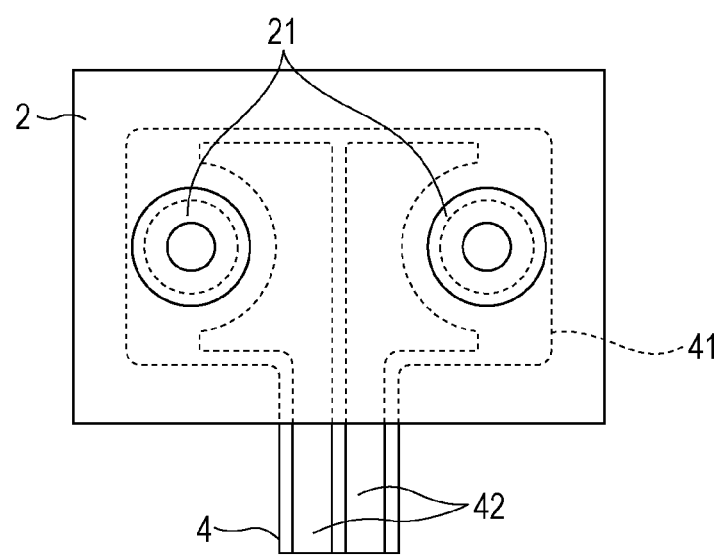
FIG. 3 is a top view illustrating a configuration of a vibration-type actuator according to a second embodiment of the present invention.

A second embodiment will be described with reference to FIG. 3. The driving principle and the configuration of components except the flexible printed circuit board 4 are the same as those in the first embodiment. In the present embodiment, a pressure is applied to the flexible printed circuit board 4 by a member made of a material of high stiffness.

The electrode portion 42 is 17.5 micrometers to 35 micrometers thick, and the base portion 41 is 12.5 micrometers to 25 micrometers thick. In bonding of the flexible printed circuit board 4 and the piezoelectric element 3, when a pressure is directly applied to the flexible printed circuit board 4 by a member made of a material of high stiffness, such as metal, the resulting stress is concentrated on the electrode portion 42 because of the electrode thickness.

Therefore, when the electrode portion 42 is disposed so as not to overlap with the internal spaces of the protrusions 21, the concentration of stress on the piezoelectric element 3 can be reduced.

In this case, since the base portion 41 can be freely disposed regardless of the locations of the protrusions 21, the bonding strength can be adjusted by extending the base portion 41.

In this example, the electrode portion 42 of the flexible printed circuit board 4 is disposed so as not to overlap with the internal spaces of the protrusions 21 in the thickness direction of the vibrator 1. However, when the electrode portion 42 of the flexible printed circuit board 4 is disposed such that at least an end of the electrode portion 42 is not overlapped with the internal spaces of the protrusions 21 in the thickness direction of the vibrator 1, the concentration of stress on the piezoelectric element 3 can be reduced. Thus, it is possible to reduce uneven application of pressure to the vibrator 1 from uneven portions created by the electrode portion 42 and the base portion 41, and reduce concentration of stress on parts of the piezoelectric element 3 overlapping with the uneven portions in the thickness direction of the vibrator 1. Therefore, by disposing the electrode portion 42 of the flexible printed circuit board 4 such that no end portion of the electrode portion 42 is overlapped with the internal spaces of the protrusions 21 in the thickness direction of the vibrator 1, the concentration of stress on the piezoelectric element 3 can be more effectively reduced.

Third Embodiment

A third embodiment concerns a method in which the stress concentration is reduced by a configuration of an electrode layer (electrode pattern) 31 of the piezoelectric element 3. The driving principle and the configuration of other components are the same as those in the first embodiment.

Figure 4A:
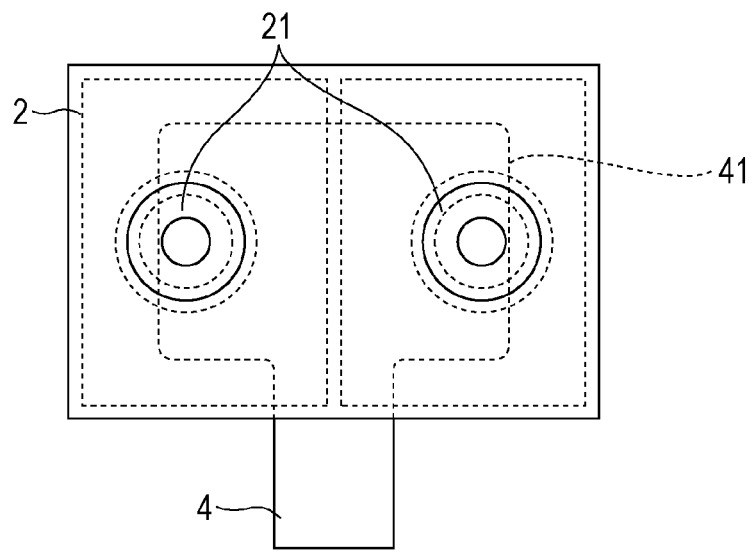
FIG. 4A is a top view illustrating a configuration of a vibration-type actuator according to a third embodiment of the present invention.
Figure 4B:
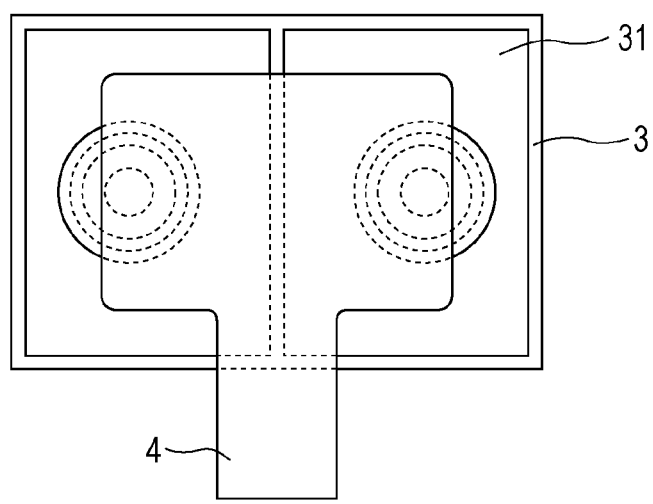
FIG. 4B is a bottom view illustrating the configuration of the vibration-type actuator according to the third embodiment of the present invention.
Figure 5:
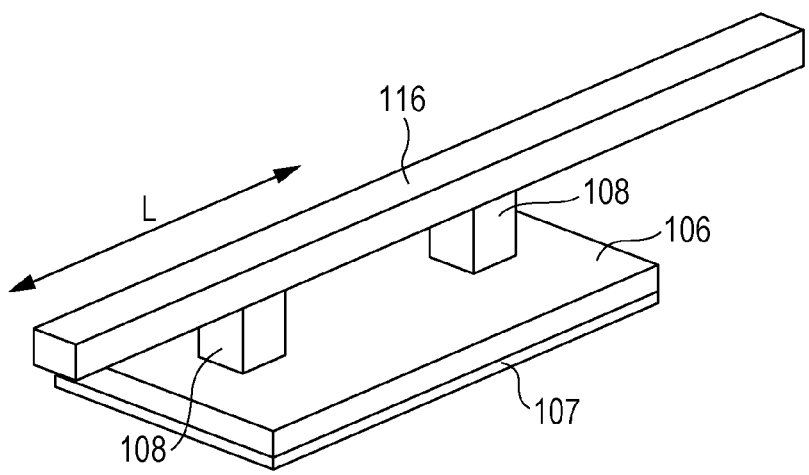
FIG. 5 illustrates a configuration of a vibration-type actuator of related art.
Figure 6A:
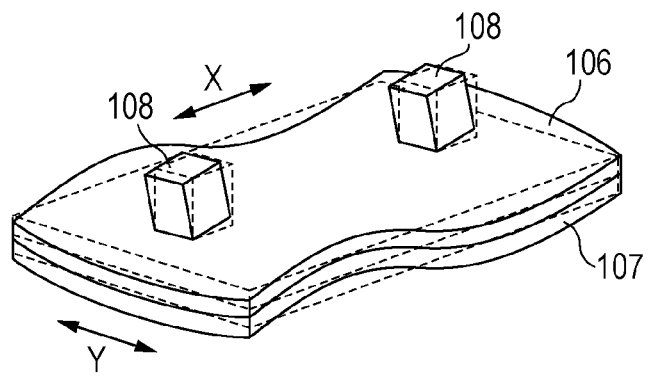
FIG. 6A illustrates a bending vibration mode of the vibration-type actuator illustrated in FIG. 5.
Figure 6B:
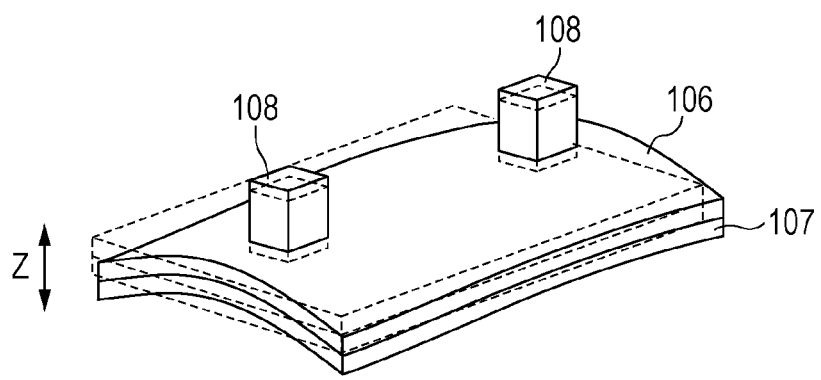
FIG. 6B illustrates another bending vibration mode of the vibration-type actuator illustrated in FIG. 5.
Figure 7A:
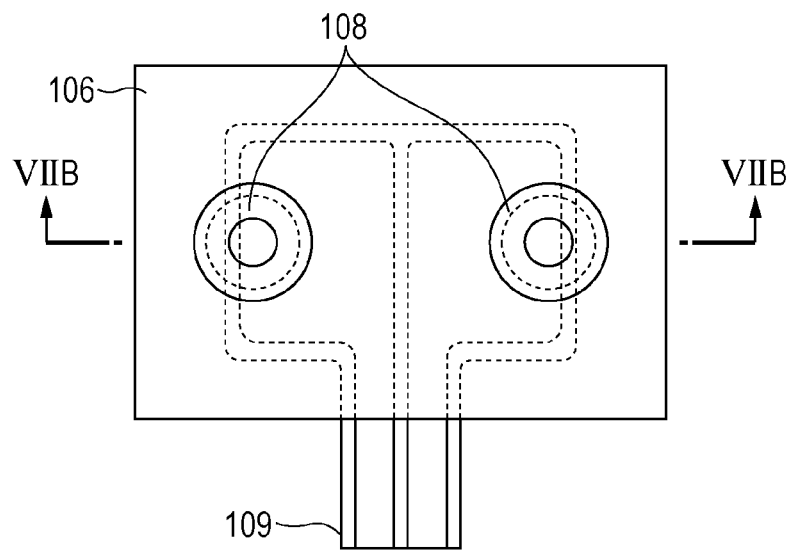
FIG. 7A is a top view illustrating another configuration of the vibration-type actuator of the related art.
Figure 7B:
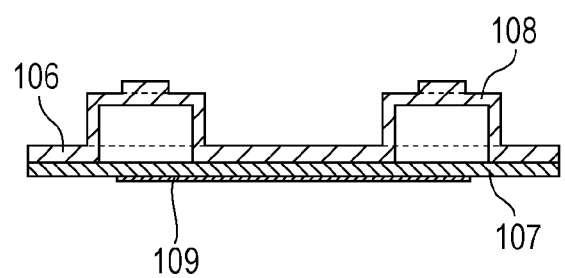
FIG. 7B is a cross-sectional view taken along line VIIB-VIIB in FIG. 7A.

In the present embodiment, as illustrated in FIG. 4A and 4B, the base portion 41 is disposed to overlap with the internal spaces of the protrusions 21, whereas the electrode layer 31 of the piezoelectric element 3 is disposed so as not to overlap with the internal spaces of the protrusions 21. For simplicity, the electrode portion 42 is not shown in FIGS. 4A and 4B. The electrode layer 31 is about 2 micrometers to 10 micrometers thick. Since uneven portions created by the electrode layer 31 are not overlapped with the internal spaces of the protrusions 21 in the direction of pressure application, the concentration of stress on the piezoelectric element 3 can be reduced. In this example, the electrode layer 31 of the piezoelectric element 3 is disposed so as not to overlap with the internal spaces of the protrusions 21 in the thickness direction of the vibrator 1. However, when the electrode layer 31 of the piezoelectric element 3 is disposed such that at least an end of the electrode layer 31 is not overlapped with the internal spaces of the protrusions 21 in the thickness direction of the vibrator 1, the concentration of stress on the piezoelectric element 3 can be reduced. By disposing the electrode layer 31 of the piezoelectric element 3 such that no end portion of the electrode layer 31 is overlapped with the internal spaces of the protrusions 21 in the thickness direction of the vibrator 1, the concentration of stress on the piezoelectric element 3 can be more effectively reduced.

Fourth Embodiment

An application of a vibration-type actuator according to the present invention will be described with reference to FIG. 8. In this example, a vibration-type actuator that drives a lens for automatic focusing is included in a lens barrel of an image pickup apparatus (optical device), such as a camera.

Figure 8:
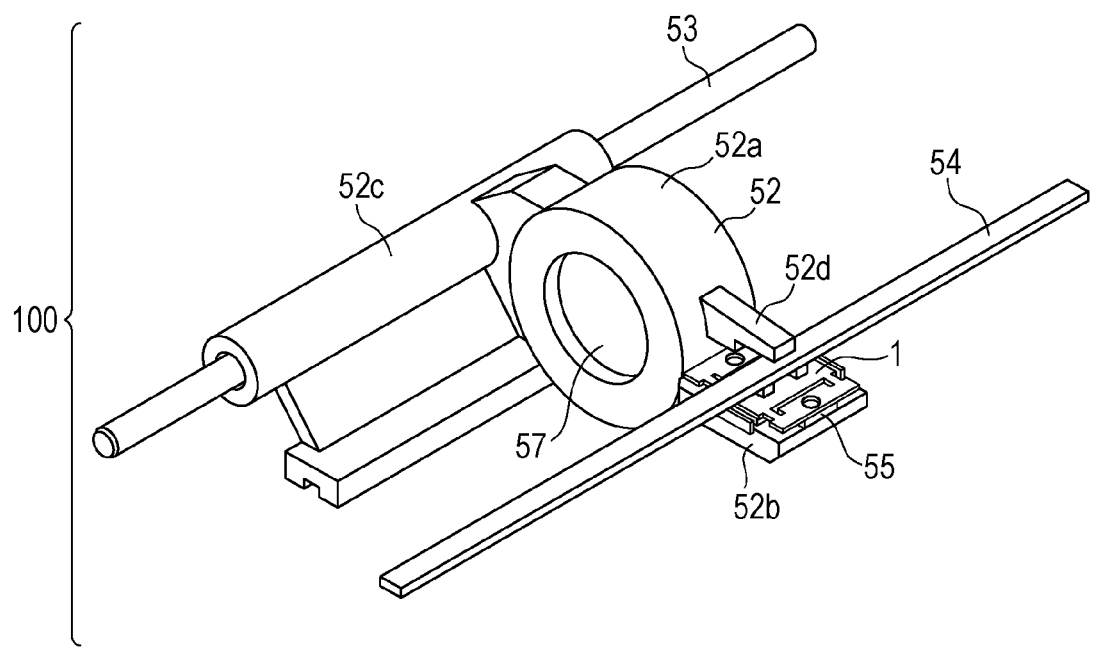
FIG. 8 illustrates an application of a vibration-type actuator.

FIG. 8 illustrates a driving mechanism for driving a lens in a lens barrel. A driving mechanism according to a fourth embodiment includes the vibration-type actuator according to any of the first to third embodiments, a driven member, and a first guide bar and a second guide bar arranged in parallel to each other and configured to slidably retain the driven member.

By elliptical motion of protrusions of the vibrator produced by applying a driving voltage to the electromechanical transducer, a relative moving force is generated between the vibrator and the second guide bar in contact with the protrusions of the elastic body. This makes the driven member movable along the first and second guide bars.

Specifically, as illustrated in FIG. 8, a driving mechanism 100 of the present embodiment primarily includes a lens holder 52 serving as a lens holding member, a lens 57, the vibrator 1 to which a flexible printed circuit board is joined, a pressure magnet 55, two guide bars 53 and 54, and a base member (not shown).

The two guide bars, the first guide bar 53 and the second guide bar 54, are each retained and secured at both ends thereof by the base member (not shown) such that they are arranged in parallel to each other.

The lens holder 52 includes a cylindrical holder portion 52a, a retaining portion 52b that retains and secures the vibrator 1 and the pressure magnet 55, and a first guide portion 52c that is fitted to the first guide bar 53 and serves as a guide.

The pressure magnet 55 that forms a pressurizing unit includes a permanent magnet and two yokes disposed on both sides of the permanent magnet. A magnetic circuit is formed between the pressure magnet 55 and the second guide bar 54, so that an attractive force is generated between them. The pressure magnet 55 is spaced from the second guide bar 54, which is disposed to be in contact with the vibrator 1. A pressure is applied between the second guide bar 54 and the vibrator 1 by the attractive force described above.

The two protrusions 21 of the elastic body are brought into pressure contact with the second guide bar 54 to form a second guide portion. The second guide portion forms a guide mechanism using a magnetic attractive force. The vibrator 1 and the second guide bar 54 are pulled apart from each other, for example, by being subjected to an external force. In this case, the lens holder 52 is returned to a desired position when a fall preventing portion 52d of the lens holder 52 hits the second guide bar 54.

Feeding a desired electric signal to the vibrator 1 generates a driving force between the vibrator 1 and the second guide bar 54. The lens holder 52 is driven by this driving force. The vibration-type actuator according to any of the first to third embodiments can be used here.

In the present embodiment, the vibration-type actuator is used to drive a lens for automatic focusing in the image pickup apparatus. However, the application of the present invention is not limited to this. For example, the vibration-type actuator may be used to drive a lens holder for moving a zoom lens. Therefore, the vibration-type actuator according to the present invention can be mounted not only in an image pickup apparatus, but also in an interchangeable lens, to drive a lens. The vibration-type actuator may be used to drive an image pickup element, or to drive a lens and an image pickup element for correction of motion blur caused by hand shake Fifth Embodiment FIG. 8 illustrates an example where a vibration-type actuator of the present invention is used in an image pickup apparatus, but the application is not limited to this. A vibration-type actuator of the present invention may also be used to drive various stages of microscopes and the like. In an example illustrated in FIG. 9, a vibration-type actuator is used to drive a stage of a microscope.

Figure 9:
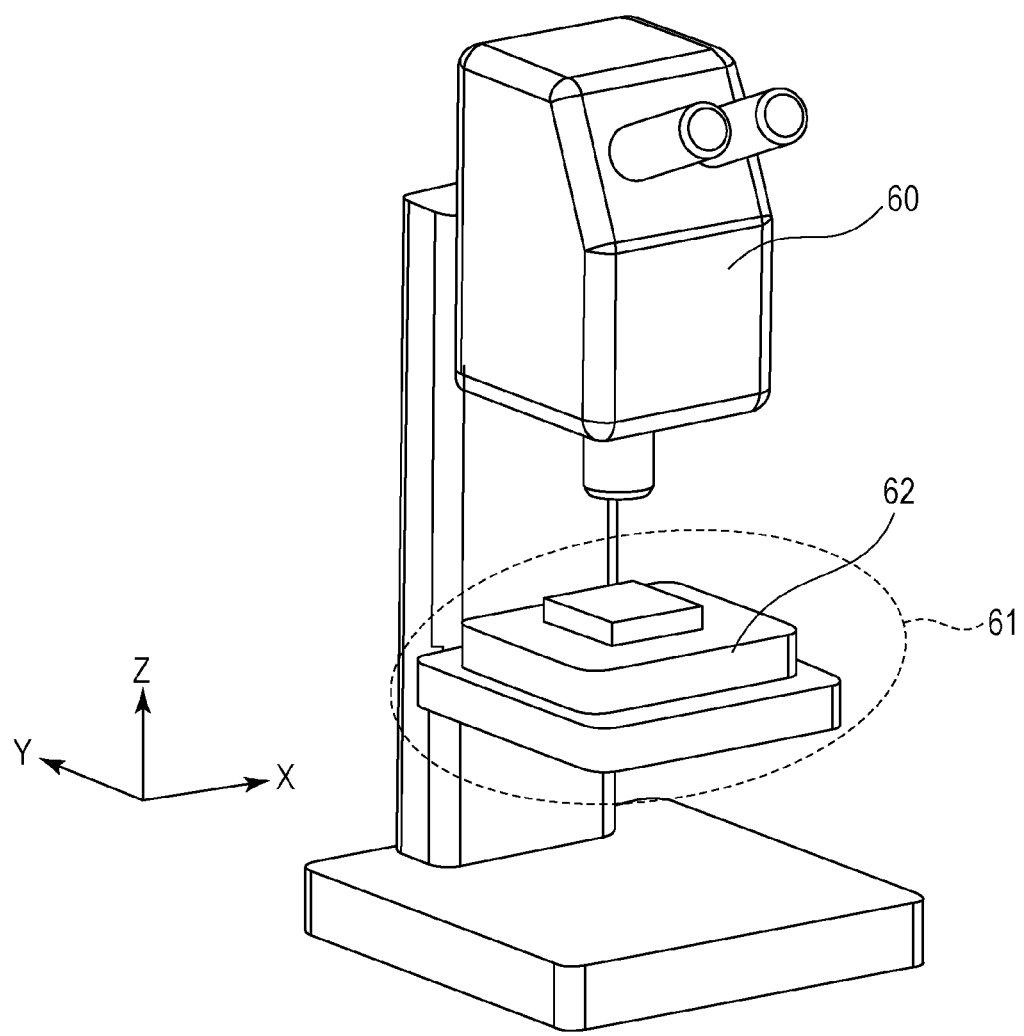
FIG. 9 illustrates another application of a vibration-type actuator.

FIG. 9 is a perspective view of a microscope serving as an image pickup apparatus according to a fifth embodiment of the present invention. The microscope illustrated in FIG. 9 includes an image pickup unit 60 having an image pickup element and an optical system therein, and an automatic stage 61 having an automatic stage 61 disposed on a base and moved by a vibration-type actuator. An object to be observed is placed on the stage 62 and an enlarged image of the object is captured by the image pickup unit 60. When the range of observation is wide, the object is moved in the X or Y direction in FIG. 9 by causing the vibration-type actuator to move the stage 62, so that many captured images are acquired. Then, a computer (not shown) combines the captured images together to generate a high-resolution image of a wide observation range.

The vibration-type actuator according to any of the first to third embodiments can be used here.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-129223, filed Jun. 20, 2013, which is hereby incorporated by reference herein in its entirety.

REFERENCE SIGNS LIST 1 vibrator
2 elastic body
21 protrusion
3 piezoelectric element
31 electrode layer
4 flexible printed circuit board
41 base portion
42 electrode portion
106 elastic body
107 electromechanical transducer
108 protrusion
109 flexible printed circuit board
116 slider

The invention claimed is:

1. A vibration-type actuator comprising:
a vibrator including an elastic body and an electromechanical transducer attached to a surface of the elastic body; and
a flexible printed circuit board having an electrode portion and attached to the electromechanical transducer,
wherein the elastic body has an attached portion to which the electromechanical transducer is attached and a protrusion having a contact portion and a standing portion between the contact portion and the attached portion,
wherein there is a space surrounded by the contact portion, the standing portion, and the electromechanical transducer, and
wherein no end portion of the electrode portion of the flexible printed circuit board is overlapped with the space in a direction perpendicular to the surface of the elastic body.

2. The vibration-type actuator according to claim 1, wherein the electrode portion of the flexible printed circuit board is not overlapped with the space in the direction perpendicular to the surface of the elastic body.

3. The vibration-type actuator according to claim 1, wherein the elastic body has a spring portion between the standing portion and the contact portion.

4. The vibration-type actuator according to claim 1, wherein the protrusion is disposed at a node portion of vibration in a long-side direction of the vibrator.

5. The vibration-type actuator according to claim 1, wherein the protrusion is disposed at an antinode portion of vibration in a short-side direction of the vibrator.

6. The vibration-type actuator according to claim 1, wherein the standing portion has a gap around the contact portion.

7. An interchangeable lens comprising:
a lens; and
the vibration-type actuator according to claim 1, the vibration-type actuator being configured to drive a lens holding member that holds the lens.

8. An image pickup apparatus comprising:
an image pickup element;
a lens; and
the vibration-type actuator according to claim 1, the vibration-type actuator being configured to drive a lens holding member that holds the lens.

9. An image pickup apparatus comprising:
a lens;
an image pickup element; and
the vibration-type actuator according to claim 1, the vibration-type actuator being configured to drive the image pickup element.

10. An automatic stage comprising:
a stage; and
the vibration-type actuator according to claim 1, the vibration-type actuator being configured to drive the stage.

11. The vibration-type actuator according to claim 1,
wherein the flexible printed circuit board has a base portion,
wherein the electrode portion is disposed on the base portion, and
wherein no end portion of the base portion of the flexible printed circuit board is overlapped with the space in the direction perpendicular to the surface of the elastic body.

12. A vibration-type actuator comprising:
a vibrator including an elastic body and an electromechanical transducer attached to a surface of the elastic body; and
a flexible printed circuit board having an electrode portion and attached to the electromechanical transducer,
wherein the elastic body has an attached portion to which the electromechanical transducer is attached and a protrusion having a contact portion and a standing portion between the contact portion and the attached portion,
wherein there is a space surrounded by the contact portion, the standing portion, and the electromechanical transducer, and
wherein the electrode portion of the flexible printed circuit board is not overlapped with the space in a direction perpendicular to the surface of the elastic body.

13. The vibration-type actuator according to claim 12, wherein no flexible printed circuit board is overlapped with the space in the direction perpendicular to the surface of the elastic body.

14. The vibration-type actuator according to claim 12,
wherein the flexible printed circuit board has a base portion,
wherein the electrode portion is disposed on the base portion, and
wherein the base portion of the flexible printed circuit board is not overlapped with the space in the direction perpendicular to the surface of the elastic body.

15. A vibration-type actuator comprising:
a vibrator including an elastic body and an electromechanical transducer attached to a surface of the elastic body and having an electrode layer; and
a flexible printed circuit board attached to the electromechanical transducer,
wherein the elastic body has an attached portion to which the electromechanical transducer is attached and a protrusion having a contact portion and a standing portion between the contact portion and the attached portion, wherein there is a space surrounded by the contact portion, the standing portion, and the electromechanical transducer, and wherein the electrode layer of the electromechanical transducer is not overlapped with the space in a direction perpendicular to the surface of the elastic body.

* * * * *